UNITED STATES PATENT OFFICE.

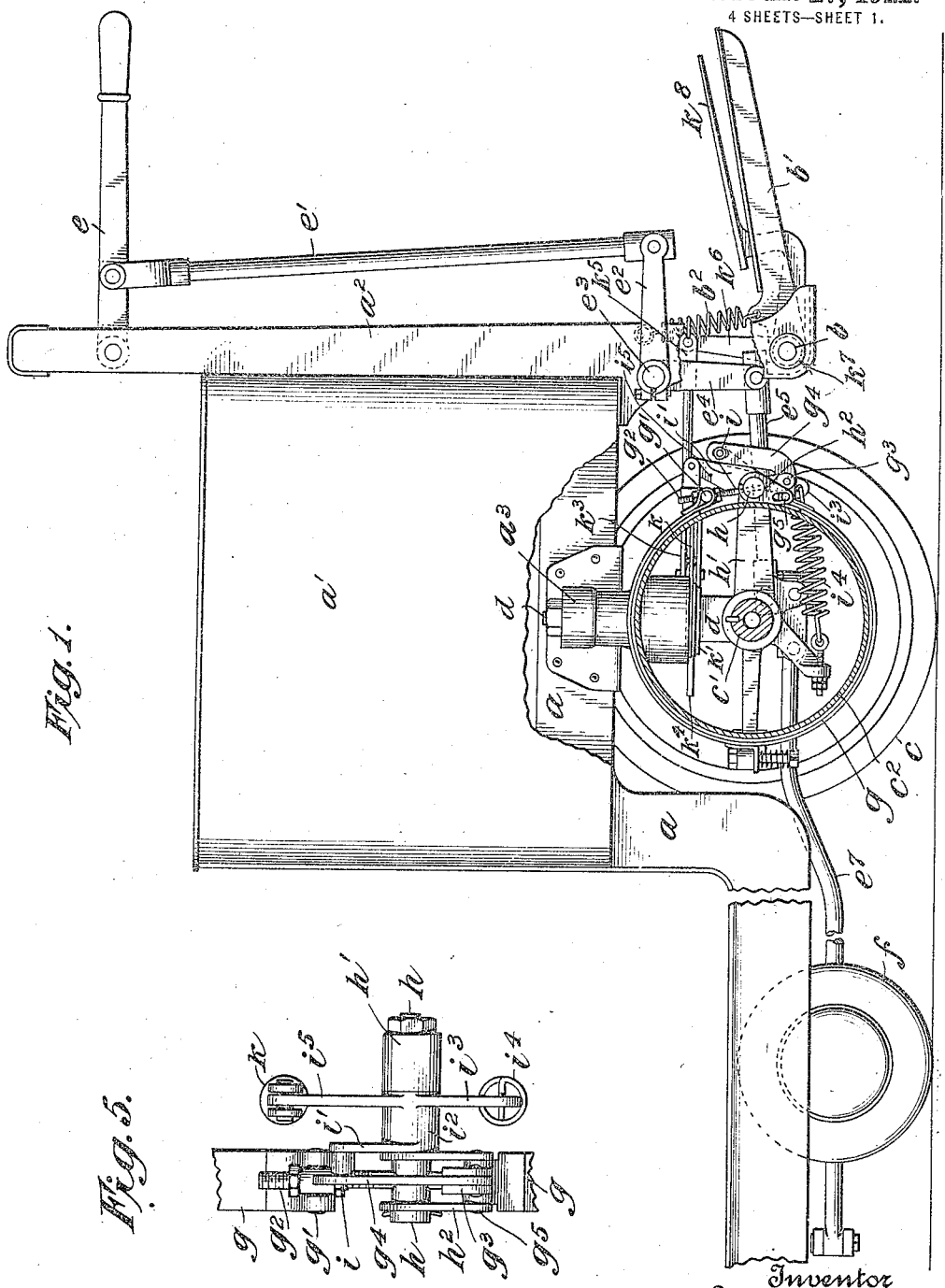

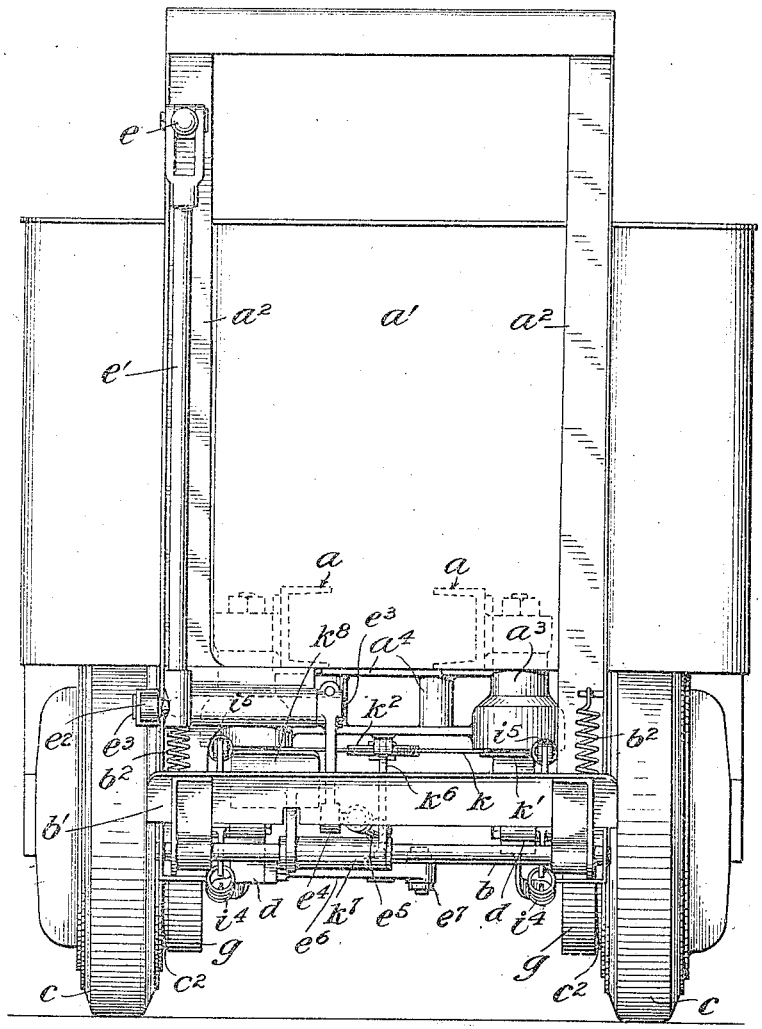

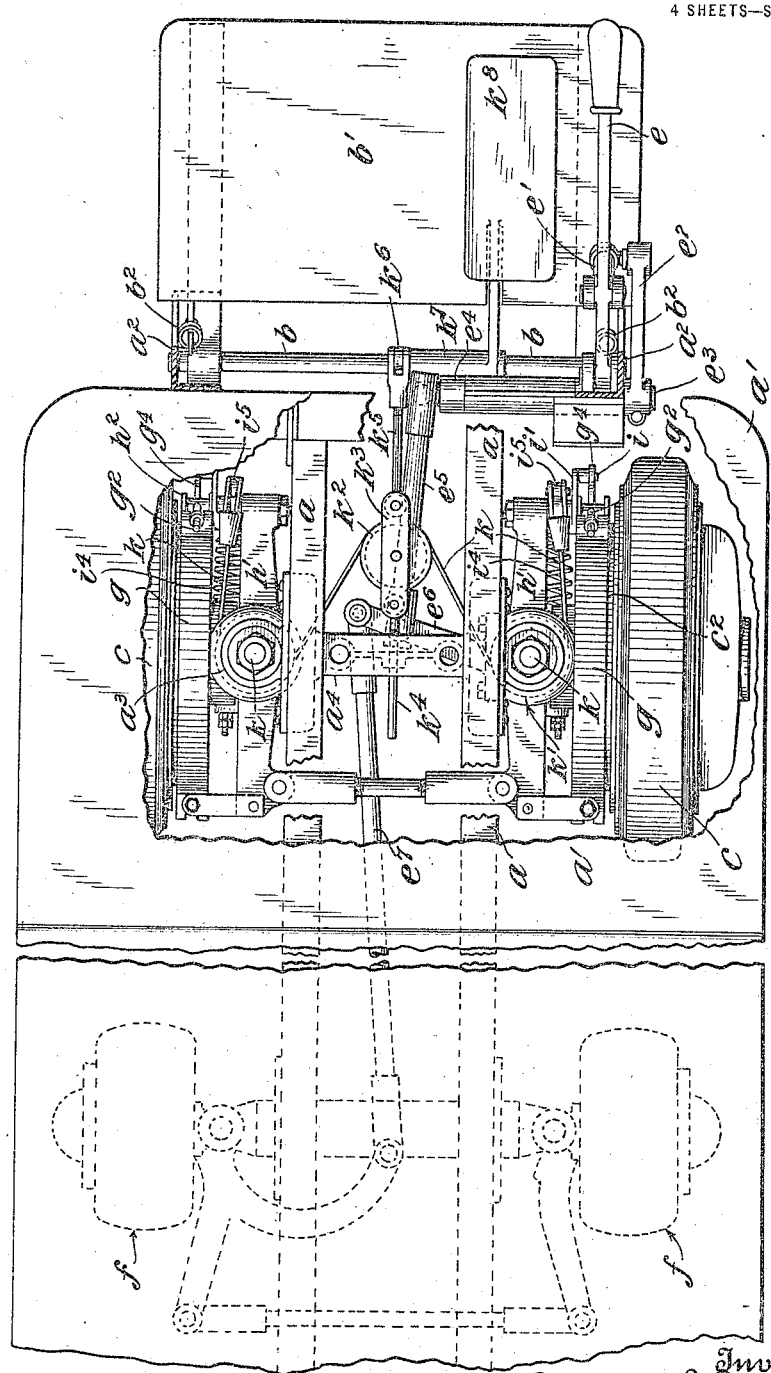

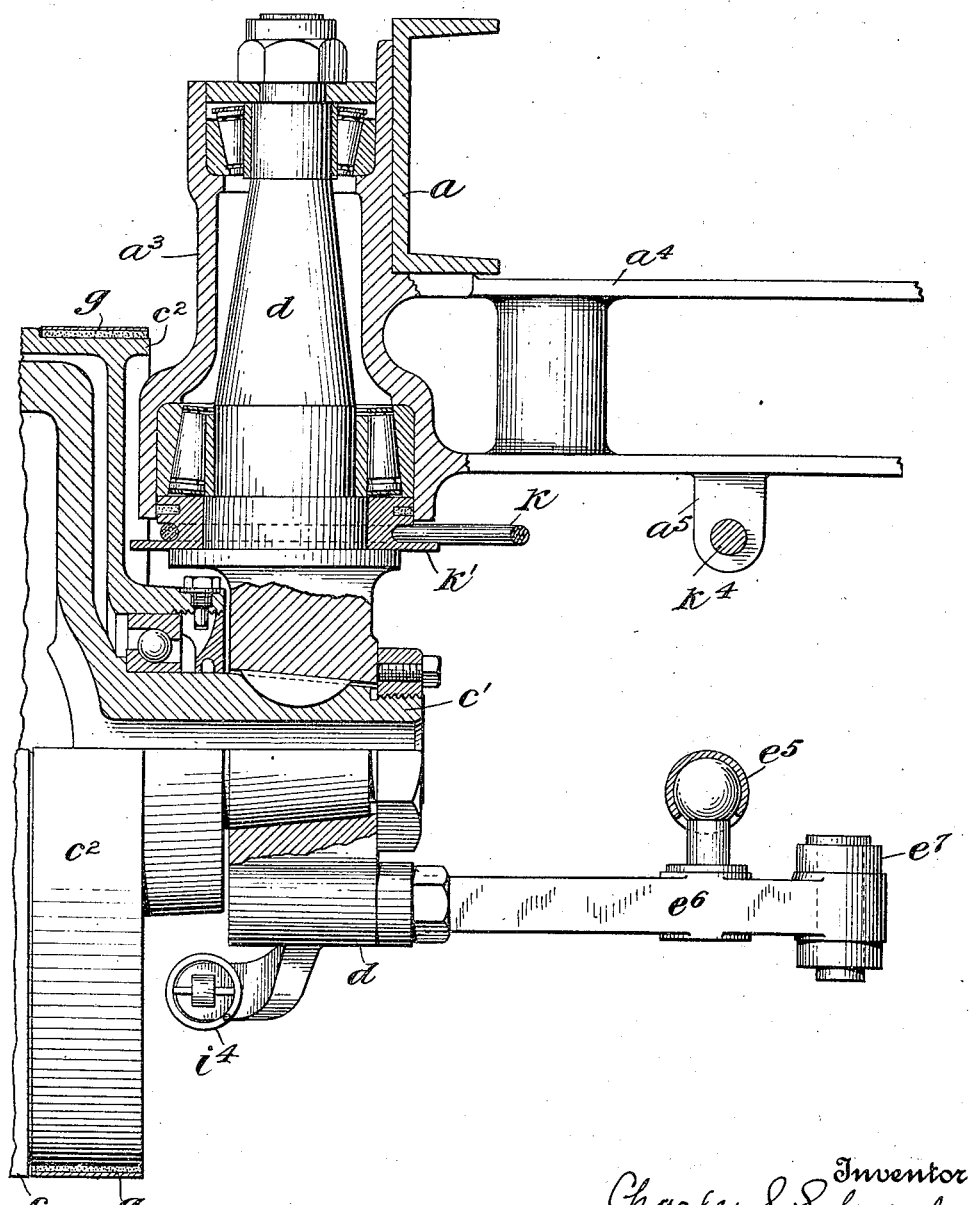

CHARLES S. SCHROEDER, OF NEW BRIGHTON, NEW YORK, ASSIGNOR, BY MESNE ASSIGNMENTS, TO THE YALE & TOWNE MANUFACTURING COMPANY, OF STAMFORD, CONNECTICUT, A CORPORATION OF CONNECTICUT.

MOTOR TRUCK.

1,420,762.   Specification of Letters Patent.   Patented June 27, 1922.

Application filed May 8, 1920. Serial No. 379,775.

*To all whom it may concern:*

Be it known that I, CHARLES S. SCHROEDER, a citizen of the United States, residing in New Brighton, in the borough of Richmond of the city of New York, in the State of New York, have invented certain new and useful Improvements in Motor Trucks, of which the following is a specification, reference being had to the accompanying drawings, forming a part hereof.

This invention is concerned particularly with motor trucks, such as are commonly used for the handling of heavy articles at freight terminals and in industrial establishments, in which the motors, electrically operated, are applied directly to or incorporated with the steering wheels or the main steering wheels, so that such wheels are both motor and steering wheels, as well as carrying wheels, and has for its object to provide improved means for the application of the brakes to such wheels, which must swing about substantially vertical axes, for the purpose of steering, as well as rotate on substantially horizontal axes. Some features of the invention, however, will be seen to be applicable to other types of motor vehicles, and particularly to those in which the steering wheels are also driving wheels, operated from the motor independent of the wheels. The invention will be more fully explained hereinafter with reference to the accompanying drawings in which it is illustrated and in which—

Figure 1 is a view in side elevation, partly broken away and in section through the band brake of one of the wheels, showing a truck to which the invention is applied.

Figure 2 is a view of the same in end elevation as seen from the right hand in Figure 1.

Figure 3 is a top view of the same with the battery box broken away.

Figure 4 is a detail view in section, illustrating particularly the supporting and steering devices for one of the wheels on a scale larger than that of Figures 1, 2 and 3.

Figure 5 is a detail view in front elevation of the devices directly involved in the operation of the brake band.

In the embodiment of the invention illustrated in the drawings the frame $a$ of the truck is shown as supporting at $a'$ a storage battery box, secured to the front of which and to the frame members are vertical frame members $a^2$. In the lower ends of the frame members $a^2$ is mounted a shaft $b$ to which is fixed the platform $b'$ upon which the driver stands while operating the truck, the platform being drawn upward by springs $b^2$, into the position shown in Figure 1, when the driver steps from the platform. The main driving wheels $c$, supposed in this instance to have incorporated with them electric motors, suitably connected as usual to a controller and storage battery not necessary to be shown, are mounted upon spindles $c'$ which are fixed in the lower ends of substantially vertical steering knuckles $d$, which are mounted, with suitable bearings, in the end portions $a^3$ of a fixed axle $a^4$, supported by the frame members $a$. A steering lever $e$, pivoted on one of the frame members $a^2$, is connected by a link $e'$ to an arm $e^2$, which is fixed on a shaft $e^3$ mounted in a suitable bearing in one of the frame members. Another arm $e^4$ fixed to the shaft $e^3$, is connected by a link $e^5$ to an arm $e^6$ which is suitably secured to the lower end of the steering knuckle $d$. As shown in Figure 3, the arm $e^6$ may also be cross-connected by a link $e^7$ to the steering knuckles of the rear wheels $f$. By the means just described the steering of the vehicle, through the swinging of the steering wheels about the substantially vertical axes of the steering knuckles, is effected by the movement of the steering lever $e$ in a vertical plane. Any usual or suitable means for this purpose may be employed.

The problem with which the present invention is directly concerned is the application of a brake to each of the steering and driving wheels, its convenient control by the driver in all the varied angular positions of the driving wheels, and its control by such means that the brakes shall be applied whenever the foot of the operator is removed, for any reason, from the brake pedal. Each driving wheel $c$ is formed with or has secured thereto a brake drum $c^2$ which is encircled by a brake band $g$. One end of the band is secured to a pin $g'$ adjustable on a threaded bolt $g^2$ which is passed through an aperture in a stud $h$, secured in the end of an arm $h'$ which is extended forwardly from the steering knuckle. The lower end of the bolt $g^2$ is forked, as at $g^3$, to engage a substantially right-angled lever $g^4$. The other end of the brake band is connected to a pin $g^5$ guided in slotted openings in the arms of a yoke $h^2$ which is hung on a stud $h$, and is mounted in the end portion of the short, horizontal arm of the right-angled lever $g^4$. The end portion of the long, substantially vertical arm of the lever $g^4$ is engaged by a pin $i$ in the end of an arm $i'$ which is carried by a sleeve or hub $i^2$ mounted on the stud $h$. Another arm $i^3$ of the sleeve or hub $i^2$ has connected to it one end of the brake spring $i^4$, while a third arm $i^5$ is connected to the corresponding end of a cable $k$ which is passed around guide-sheaves $k'$, concentric respectively with the steering knuckles $d$ and preferably mounted thereon. The bight of the cable $k$, the two ends of which are connected to the arms $i^5$ respectively, is engaged by a guide-sheave $k^2$ carried in a housing $k^3$ which has at one end a guide rod $k^4$, guided in an aperture in a lug $a^5$ of the fixed axle $a^4$. The other end of the housing $k^3$ is connected by a link $k^5$ with an arm $k^6$ of a sleeve $k^7$ mounted on the shaft $b$. The brake pedal $k^8$, which is independent of the platform $b'$, is fixed to the sleeve $k^7$ and is held normally in its elevated position, as shown in Figure 1, by the spring $i^4$, through its connections.

It will be understood that in operation the action of the spring $i^4$ on the arm $i^3$ moves the arm $i'$ in such a direction that the right-angled lever $g^4$ draws the two ends of the brake band toward each other, so that without the intervention of the driver each brake band $g$ is tightened about the corresponding drum $c^2$ and the brakes are applied. The application of the driver's foot to the brake pedal $k^8$, however, tightens the cable $k$ and, through the arms $i^5$, acting against the springs $i^4$, moves the arms $i'$ and the levers $g^4$ in a direction to cause the ends of the brake bands to separate, thereby releasing the brakes. It will be observed that the brake operating levers $i'$, $i^3$ and $g^4$ are carried by the steering knuckle and swing with the wheel and that the brake controlling lever or pedal $k^8$ acts through connections which are concentric with each steering knuckle so that the application or release of the brake are in no wise affected by the change in angular position of the steering wheel.

It will be understood that various changes in details of construction and arrangement can be made to suit different conditions of use or the convenience of the manufacturer and that the invention is not limited to the precise construction shown and described herein except as pointed out in the claims.

I claim as my invention:

1. In a motor truck, the combination of a steering knuckle, a wheel carried by the steering knuckle and having a brake drum, a brake band and connected operating levers therefor supported by the steering knuckle the two ends of said brake band being connected with one of said operating levers, a brake controlling lever mounted independently of the steering knuckle, and an operative connection from the controlling lever to the operating levers disposed concentrically with the steering knuckle.

2. In a motor truck, the combination of a steering knuckle, a wheel carried by the steering knuckle and having a brake drum, a brake band and connected operating levers therefor supported by the steering knuckle the two ends of said brake band being secured to one of said operating levers, a brake controlling lever mounted independently of the steering knuckle, a cable connected to the brake operating levers, a guide therefor concentric with the steering knuckle, and an operative connection between the controlling lever and the cable.

3. In a motor truck, the combination of a steering knuckle, a wheel carried by the steering knuckle and having a brake drum, an arm extended from the steering knuckle, brake operating levers mounted on said arm, and a brake band cooperating with the brake drum and operatively connected at its two ends with one of said operating levers.

4. In a motor truck, the combination of a steering knuckle, a wheel carried by the steering knuckle and having a brake drum, an arm extended from the steering knuckle, a stud carried by said arm, an arm mounted to swing on said stud, a bent lever engaged at one end by said latter arm, and a brake band having its opposite ends connected with the other arm of said bent lever at different points.

5. In a motor truck, the combination of a steering knuckle, a wheel carried by the steering knuckle and having a brake drum, an arm extended from the steering knuckle, a stud carried by said arm, a brake band, an arm mounted to swing on said stud, operative connections between the brake band and said latter arm, a spring operatively connected at one end with said arm and at the other end with the steering knuckle, and controlling means operatively connected to said arm to move the same in opposition to the spring.

This specification signed this 7th day of May A. D. 1920.

CHARLES S. SCHROEDER.